US006791536B2

(12) United States Patent
Keely et al.

(10) Patent No.: US 6,791,536 B2
(45) Date of Patent: Sep. 14, 2004

(54) SIMULATING GESTURES OF A POINTING DEVICE USING A STYLUS AND PROVIDING FEEDBACK THERETO

(75) Inventors: Leroy B. Keely, Portola Valley, CA (US); David F. Jones, Redmond, WA (US); David Switzer, Redmond, WA (US); Michael Hin-cheung Tsang, Bellevue, WA (US); William Hong Vong, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 69 days.

(21) Appl. No.: 09/815,272

(22) Filed: Mar. 23, 2001

(65) Prior Publication Data

US 2002/0057263 A1 May 16, 2002

Related U.S. Application Data

(60) Provisional application No. 60/247,844, filed on Nov. 10, 2000.

(51) Int. Cl.[7] ............................................... G09G 5/00
(52) U.S. Cl. ................. 345/173; 345/161; 345/163; 345/168; 345/173; 345/179; 345/863
(58) Field of Search .......................... 345/173, 156, 345/161, 163, 167, 168, 179, 863; 178/19.01, 19.04, 20.01; 703/17, 19, 21–24

(56) References Cited

U.S. PATENT DOCUMENTS

| 4,899,138 A | * | 2/1990 | Araki et al. ................. 345/175 |
| 5,404,458 A | * | 4/1995 | Zetts ............................ 710/73 |
| 5,592,566 A | * | 1/1997 | Pagallo et al. .............. 382/187 |
| 5,602,570 A | * | 2/1997 | Capps et al. ................. 345/173 |
| 5,666,113 A | * | 9/1997 | Logan ........................... 341/34 |
| 5,864,635 A | * | 1/1999 | Zetts et al. ................. 382/187 |
| 5,880,411 A | * | 3/1999 | Gillespie et al. .......... 178/18.01 |
| 6,049,329 A | * | 4/2000 | Zetts et al. ................. 345/179 |
| 6,262,719 B1 | * | 7/2001 | Bi et al. ...................... 345/179 |
| 6,266,050 B1 | * | 7/2001 | Oh et al. ..................... 345/173 |

\* cited by examiner

*Primary Examiner*—Henry N. Tran
(74) *Attorney, Agent, or Firm*—Banner & Witcoff, Ltd.

(57) ABSTRACT

A method and apparatus for simulating at least one gesture of a pointing device such as a mouse. A left click, right click, left drag, right drag, and/or mouse movement may be simulated using a stylus in conjunction with a touch-sensitive display surface. For example, a computer having the display surface may detect whether a stylus is being held down on a touch-sensitive display surface for at least a threshold amount of time. The computer may further detect whether the stylus is then removed from the touch-sensitive display surface after at least the threshold amount of time. Responsive to the stylus being removed, the computer may generate at least one event representing a right mouse button being pressed.

47 Claims, 4 Drawing Sheets

SIMULATING GESTURES OF A POINTING DEVICE USING A STYLUS AND PROVIDING FEEDBACK THERETO

CROSS-REFERENCE TO RELATED APPLICATIONS

The present application claims priority to U.S. provisional patent application Serial No. 60/247,844, entitled Simulating Gestures of a Mouse Using a Stylus and Providing Feedback Thereto, filed Nov. 10, 2000, which is hereby incorporated by reference as to its entirety. The present application is also related to application Ser. No. 09/760,631, entitled Method and Apparatus For Improving the Appearance of Digitally Represented Handwriting, filed Nov. 10, 2000; to application Ser. No. 60/247,841, entitled Highlevel Active Pen Matrix, filed Nov. 10, 2000; to application Ser. No. 60/247,973, entitled Selection Handles in Editing Electronic Documents, filed Nov. 10, 200; to application Ser. No. 60,247,842, entitled Insertion Point Bungee Space Tool, filed Nov. 10, 2000; to application Ser. No. 60/247,400, entitled System and Method for Accepting Disparate Types of User Input, filed Nov. 10, 2000; to application Ser. No. 60/247,972, entitled In Air Gestures, filed Nov. 10, 2000; to application Ser. No. 60/247,831, entitled Mouse Input Panel Windows Class List, filed Nov. 10, 2000; to application Ser. No. 60/247,843, entitled Mouse Input Panel and User Interface, filed Nov. 10, 2000; to application Ser. No. 60/247,479, entitled System and Method for Inserting Implicit Page Breaks, filed Nov. 10, 2000; to application Ser. No. 09/750,288, entitled Classifying, Anchoring, and Transforming Ink, filed Dec. 29, 2000; to application Ser. No. 09/736,170, entitled Highlevel Active Pen Matrix, filed Dec. 15, 2000; and to application Ser. No. 09/741,107, entitled Mode Hinting/Switching, filed Dec. 21, 2000; each of which is incorporated by reference herein as to their entireties.

FIELD OF THE INVENTION

The present invention is directed generally to apparatus and methods for simulating various gestures of a pointing device with multiple switches, such as a two button mouse in a computer system, and for providing feedback thereto, and more specifically to simulating gestures such as the left click of a mouse, the right click of a mouse, and mouse dragging by manipulation of a stylus in conjunction with a touch-sensitive computer display, as well as generating appropriate visual or other feedback in response to certain gestures.

BACKGROUND OF THE INVENTION

Typical computer systems, especially computer systems using graphical user interface (GUI) systems such as Microsoft WINDOWS, are optimized for accepting user input from two discrete input devices: a keyboard for entering text, and a pointing device such as a mouse with two or more buttons or other selectors for driving the user interface. Virtually all software applications designed to run on Microsoft WINDOWS are optimized to accept user input in the same manner. For instance, many applications make extensive use of a primary switch of the pointing device such as the left button of a mouse (a gesture commonly referred to as a "left click" of a mouse) to select an object, and a secondary switch such as the right button of the mouse (a gesture commonly referred to as a "right click" of a mouse) to display context-sensitive command menus. It is noted that other operating systems incorporate left and right click operability as well. The user may generate other gestures using the mouse such as by clicking the left or right button of the mouse and moving the mouse while the button is depressed (a gesture commonly referred to as either a "left drag" or a "right drag," respectively).

While such mouse gestures are of course easily done with an actual mouse, it is not always convenient for a user to use a mouse with a computer even though the computer may have a GUI system. For instance, when using a portable system there may not always be a surface available upon which to place a mouse. Some systems utilize a touch-sensitive display screen with a stylus as an input device. The user places the stylus tip upon the touch-sensitive display screen at various locations to control objects displayed on the display screen. A problem with this type of system is that the stylus is limited in the types of actions that may be easily performed as compared with a mouse. For instance, the typical stylus can perform only three types of movements: placing the stylus tip onto the screen, moving the stylus tip across the screen, and removing the stylus tip from the screen. While a user may operate a remote toolbar to select a different tool, the excessive movement renders the control of the system laborious, inconvenient, and slow. Using the tip of the stylus-type device, there is presently no convenient way to simulate or distinguish between, for example, a right click as opposed to a left click as interpreted by the operating system.

In order to make the full range of interface features accessible to users of such a stylus-based computer, there is a need for an intuitive way of simulating mouse gestures with the stylus. Although not necessary, it is preferable and more useful that any new way of simulating mouse gestures be compatible with existing software applications that conventionally are used with a mouse.

There is also a need for providing helpful feedback to the user of the stylus to indicate whether gestures made with the stylus are those that are intended by the user. This is useful with a stylus-type input device since there is conventionally little to no natural tactile or auditory feedback when using a stylus than there is when using a mouse (e.g., the buttons of a mouse often have a definitive mechanical "click" feel and sound when pressed). As will be seen, such feedback is even more useful when provided in conjunction with various gesture simulation techniques of the present invention.

SUMMARY OF THE INVENTION

As discussed in the various copending patent applications incorporated herein by reference, aspects of the present invention are directed to a tablet-like computer that may be used for directly writing on a touch-sensitive display surface using a stylus. The computer may allow the user to write and to edit, manipulate, and create objects through the use of the stylus. Many of the features discussed in these copending applications are even more useful in combination with various aspects of the present invention discussed herein.

An aspect of the present invention is directed to methods and apparatus for simulating gestures of a pointing device, such as a mouse, trackball, or joystick, by use of a stylus on a touch-sensitive display surface. For example, a left click of a mouse may be simulated, e.g., where the user holds the stylus down on the touch-sensitive display surface without substantial movement and then removes the stylus from the display surface before the expiration of a threshold amount of time. A right click of a mouse may be simulated, e.g., where the user waits until at least the threshold amount of time before removing the stylus. Where the stylus is moved along the display surface during certain stylus gestures, left or right dragging may thereby be simulated.

Another aspect of the present invention is directed to methods and apparatus for providing feedback to a user in a stylus-based touch-sensitive display surface computer system. The user may accordingly be given some indication that the user has performed a particular stylus gesture, e.g., by displaying a visual object on the display surface to indicate a particular status. Such feedback may be responsive to certain stylus gestures such as pressing and holding the stylus against the display surface for at least a certain minimum amount of time. More generally, the feedback may be in the form of a "state change indicator," which may be visual on the display surface such as an icon, bitmap, or other visual object or indicator, and/or auditory such as a sound emitted from the computer's speakers. The state change indicator may be animated and or otherwise vary with stylus hold time. Significant advantages of this aspect of the invention are realized in conjunction with the various features discussed in the copending patent applications incorporated herein by reference.

These and other features of the invention will be apparent upon consideration of the following detailed description of preferred embodiments. Although the invention has been defined using the appended claims, these claims are exemplary in that the invention is intended to include the elements and steps described herein in any combination or subcombination. Accordingly, there are any number of alternative combinations for defining the invention, which incorporate one or more elements from the specification, including the description, claims, and drawings, in various combinations or subcombinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It is intended that the written description of the invention contained herein covers all such modifications and alterations.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention. In the accompanying drawings, elements are labeled with three-digit reference numbers, wherein the first digit of a reference number indicates the drawing number in which the element is first illustrated. The same reference number in different drawings refers to the same element.

DETAILED DESCRIPTION OF PREFERRED EMBODIMENTS

Figure 1:
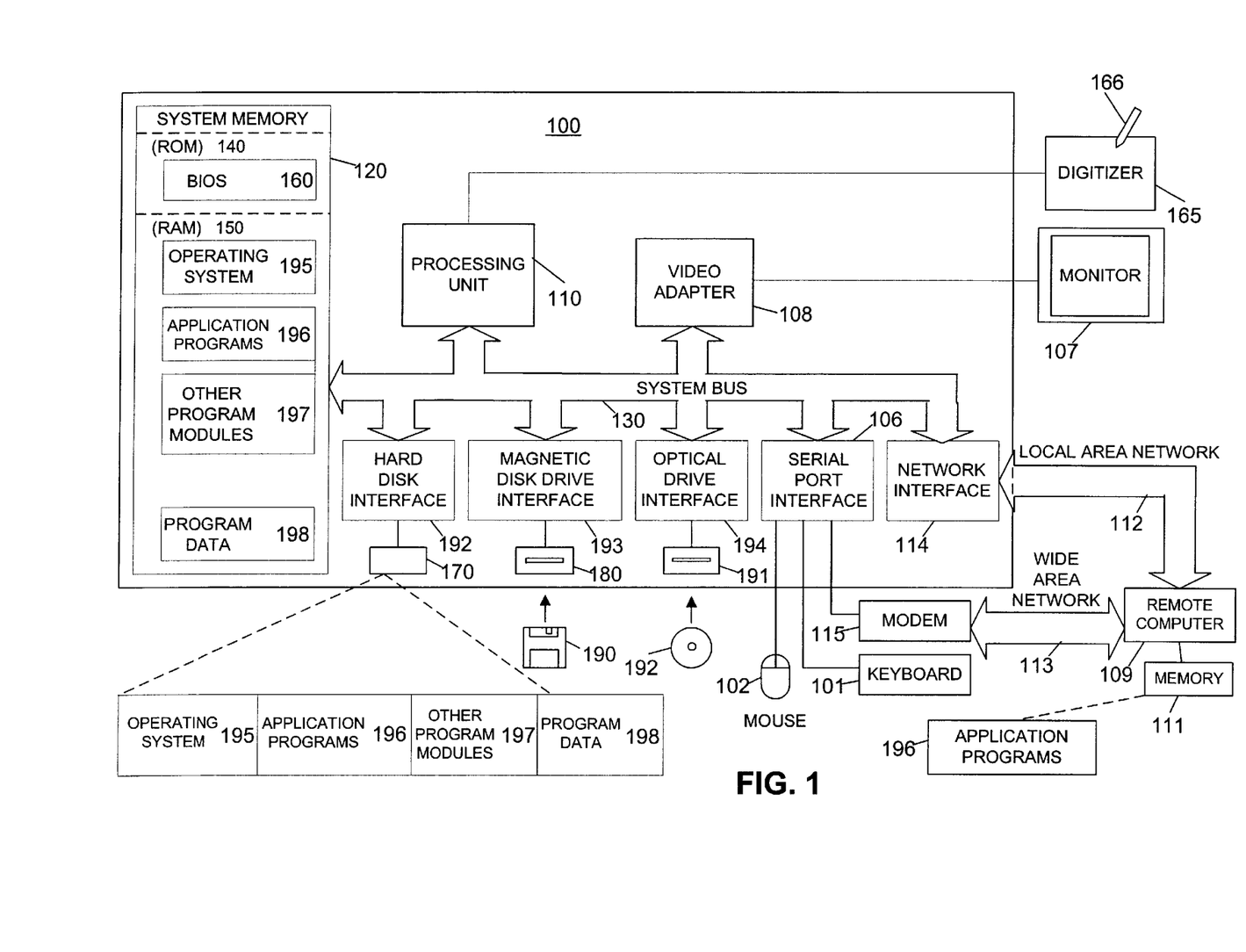
FIG. 1 is a schematic diagram of a general-purpose digital computing environment that can be used to implement various aspects of the invention.

FIG. 1 shows an exemplary embodiment of a general-purpose digital computing environment that can be used to implement various aspects of the invention. In this embodiment, computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory includes read only memory (ROM) 140 and random access memory (RAM) 150.

A basic input/output system 160 (BIOS), containing the basic routines that help to transfer information between elements within the computer 100, such as during start-up, is stored in ROM 140. Computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner, or the like. These and other input devices are often connected to the processing unit 110 through a serial port interface 106 that is coupled to the system bus, but may be connected by other interfaces, such as a parallel port, game port or a universal serial bus (USB). A monitor 107 or other type of display device is also connected to the system bus 130 via an interface, such as a video adapter 108. In addition to the monitor, personal computers typically include other peripheral output devices (not shown), such as speakers and printers.

The computer 100 can operate in a networked environment using logical connections to one or more remote computers, such as a remote computer 109. Remote computer 109 can be a server, a router, a network PC, a peer device or other common network node, and typically includes many or all of the elements described above relative to computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are example and other means of establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Figure 2:
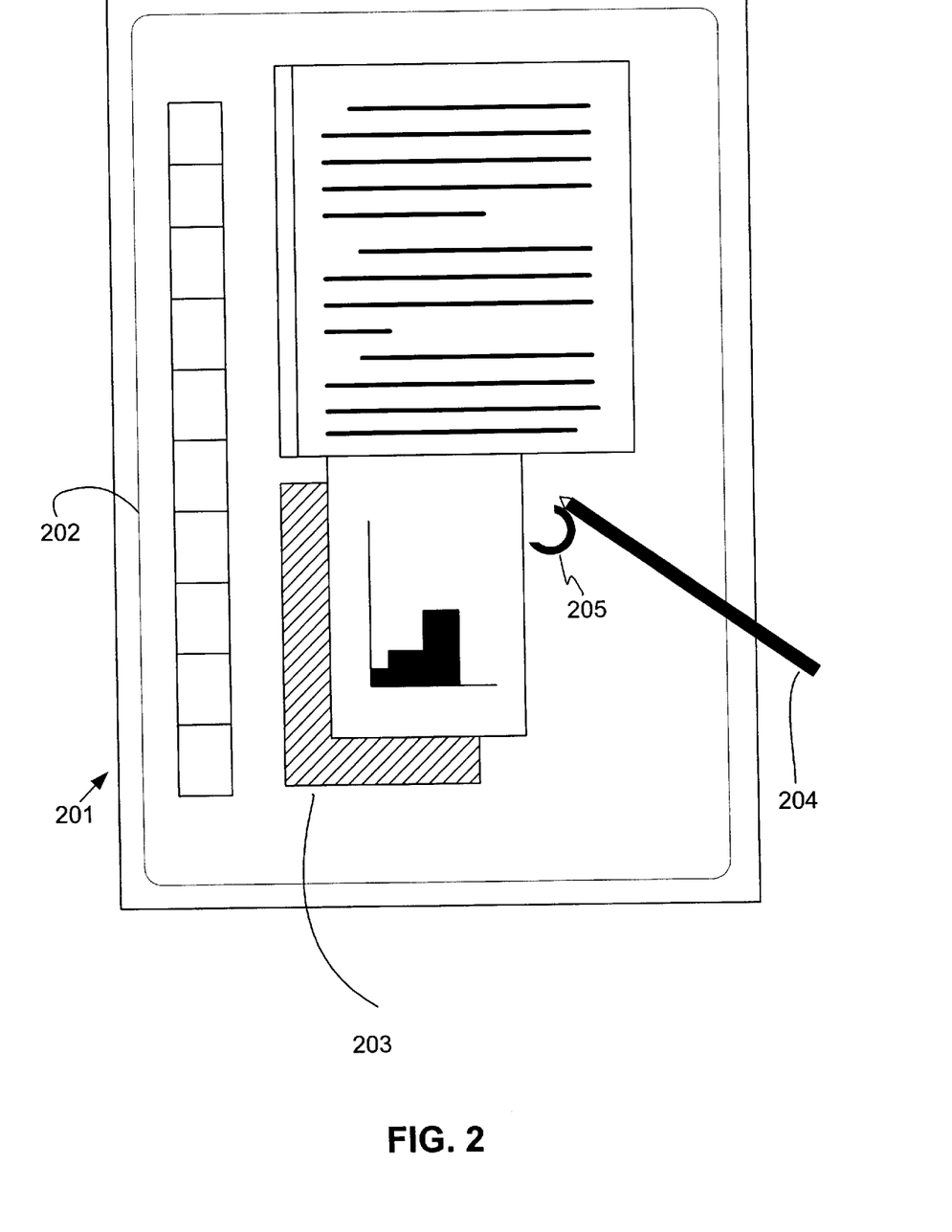
FIG. 2 is a plan view of a tablet computer and stylus that can be used in accordance with various aspects of the present invention.

FIG. 2 illustrates a tablet PC 201 that can be used in accordance with various aspects of the present invention. Any or all of the features, subsystems, and functions in the system of FIG. 1 can be included in the computer of FIG. 2. Tablet PC 201 includes a large touch-sensitive display surface 202, e.g., a digitizing flat panel display, for example, a liquid crystal display (LCD) screen, on which a plurality of windows 203 is displayed. Using a stylus 204, a user can select, highlight, and write on the digitizing display area. Examples of suitable digitizing display panels include electromagnetic pen digitizers, such as the Mutoh or Wacom pen digitizers. Other types of pen digitizers, e.g., optical digitizers, may also be used. Tablet PC 201 interprets marks made using stylus 204 in order to manipulate data, enter text, and execute conventional computer application tasks such as spreadsheets, word processing programs, and the like. The touch-sensitive display surface 202 may also be proximity-sensitive such that the tip of the stylus 204 may be sensed by the display surface 202 when proximate thereto without actually contacting the display surface 202.

The stylus 204 may be equipped with or without buttons or other features to augment its selection capabilities. In one embodiment, the stylus 204 may be implemented as a "pencil" or "pen", in which one end constitutes a writing, or tip, portion and the other end constitutes an "eraser" end that, when moved across the display indicates portions of the display that are to be erased. The term "stylus" as used herein is intended to have a broad definition that includes, e.g., a user's own finger, a pen, a pencil, a stick, a rod, and/or any other similar device suitable for pointing at a particular location on the display surface 202. Other types of pointing devices, such as a mouse, trackball, or the like may be used with the tablet PC 201 in addition to or conjunction with the stylus 204.

Figure 3:
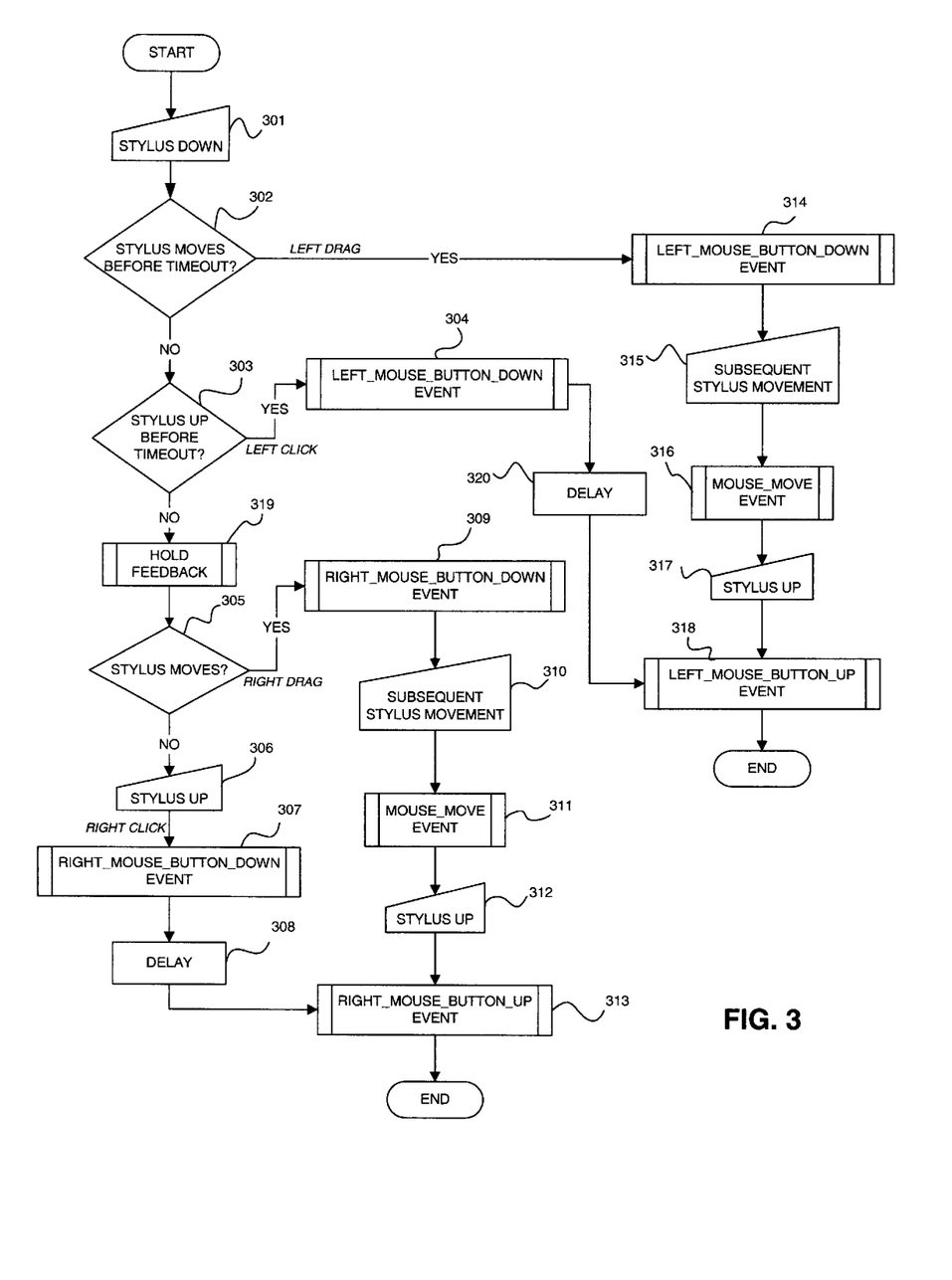
FIG. 3 is a flow chart showing an exemplary set of steps that may be performed in order to simulate a right click of a mouse according to aspects of the present invention.

Referring now to FIG. 3, an example of how a left drag of a mouse is simulated is now discussed. Any or all of steps set forth herein and in FIG. 3 may be performed by special software, hardware, and/or firmware that runs in conjunction with, or is part of, the operating system of the computer 201. To simulate a left drag, the user may touch the stylus 204 or other similar user pointing device to the display surface 202, an action referred to hereafter as "placing the stylus down" (step 301). Responsive to the computer 201 detecting the stylus being placed down, the computer 201 may begin counting time, e.g., by using a timer, up to at least a threshold amount of time. A timeout condition is defined responsive to the threshold amount of time having passed. In one embodiment, the threshold amount of time is about 600 milliseconds. However, the threshold amount of time may be any amount of time, such as between 300 and 600 milliseconds, or between 600 milliseconds and 1 second, or greater than 1 second. If the computer 201 detects that the stylus moves prior to the timeout condition occurring (step 302), then in response the computer 201 may generate a standard Microsoft WINDOWS LeftMouseButtonDown event (or other event that represents the primary switch of the pointing device being activated) in the original position where the stylus 204 was first brought down (step 314), which may be sent to the software application presently in use. At this point, any subsequent movement of the stylus 204 across the display surface 202 may be detected by the computer 201 (step 315), and in response the computer 201 may generate one or more Microsoft WINDOWS MouseMove events (step 316) (or other events representing movement of the pointing device). When the stylus 204 is eventually removed from the display surface 202 (hereafter referred to as "bringing the stylus up") (step 317), the computer 201 may detect this and in response may generate a Microsoft WINDOWS LeftMouseButtonUp event (step 318) (or other event that represents the primary switch being deactivated). Thus, via steps 301, 302, and 314–318, a left drag of a mouse is simulated.

To simulate a left click of a mouse without dragging, if the computer 201 detects that the stylus 204 is not moved prior to the timeout condition (step 302), and if instead the stylus 204 is brought up prior to the timeout condition (step 303), then in response the computer 201 may generate first a LeftMouseButtonDown event (or other event that represents the primary switch being activated), then optionally delay for a period of time (step 320) such as about 20 milliseconds or some other amount of time, and then generate a LeftMouseButtonUp event (steps 304 and 318) (or other event that represents the primary switch being deactivated). Thus, via steps 301–304, 318, and 320, a slightly delayed left click of a mouse is simulated.

To simulate a right click of a mouse without dragging, if the computer 201 detects that the stylus 204 is not moved either prior to the timeout condition or after the timeout condition (steps 302 and 305), and if the computer 201 further detects that the stylus 204 is not brought up until after the timeout condition (steps 303 and 306), and thus that the stylus 204 has been held down for at least the threshold amount of time, then in response the computer 201 may generate first a Microsoft WINDOWS RightMouseButtonDown event (step 307) (or other event that represents the secondary switch of the pointing device being activated). The computer 201 may, further in response, optionally delay for a period of time (step 308), in one embodiment, about 20 milliseconds, and then generate a Microsoft WINDOWS RightMouseButtonUp event (step 313) (or other event that represents the secondary switch being deactivated). The computer 201 may also generate and display a state change indicator (step 319) that indicates to the user that the stylus 204 has been placed down for a certain minimum amount of time, as will be discussed below in more detail.

It is noted that steps 319 may be in a variety of places within the flowchart of FIG. 3 other than the one shown, such as between steps 305 and 306. Steps 301–303, 305–308, and 313, thus simulate a delayed right click of a mouse.

To simulate a right drag of a mouse, if the computer 201 detects that the stylus 204 is not moved until after the timeout condition (step 305), then in response the computer 201 may generate a RightMouseButtonDown event (step 309) (or other event that represents the secondary switch being activated). Upon the computer 201 detecting any subsequent movement of the stylus 204 along the display surface 202 (step 310), the computer 201 may in response generate one or more MouseMove events (step 311) (or other events representing movement of the pointing device). When the computer detects that the stylus 204 is brought up (312), in response the computer 201 may generate a Right-MouseButtonUp event (step 313) (or other event that represents the secondary switch being deactivated). This simulates, via steps 301–303, 305, and 309–313, a right drag of a mouse.

As a further feature of the right click simulation, a special hold event may be defined wherein the stylus 204 is held against the display screen 202 without substantial movement for at least another threshold amount of time, say about 700 milliseconds, or between 0.5 and 1 second, or between about 1 and 3 seconds or more, the computer 201 may detect such a hold event and in response act by immediately interpreting any subsequent holding of the stylus 204 as holding the left mouse button down (or, more generally, as activating the primary switch of the pointing device). Thus, the computer 201 may, after 600 milliseconds of stylus holding, go on to steps 305 and 319, and where the stylus 204 is released prior to, say, 5 seconds or some other time limit, then steps 306–308 and 313 may be implemented. However, if instead the stylus 204 is further held at least 5 seconds, then the special subroutine may, in response, immediately generate a LeftMouseButtonDown event (or other event that represents the primary switch of the pointing device being activated). Then, when the stylus is eventually released, a LeftMouseButtonUp event (or other event that represents the primary switch being deactivated) would be generated by the special subroutine. If the stylus 204 is moved along the display surface 202, then the computer 201 may immediately in response generate one or more MouseMove events (or other events representing movement of the pointing device). When the stylus 204 is eventually removed from the display surface 202, all pending RightMouse events (or other events that represent action by the secondary switch of the pointing device) that would normally have been generated in accordance with the method shown in FIG. 3 would be canceled.

In the above and remaining discussion, it is assumed that a Microsoft WINDOWS operating system is being used with the computer 201. However, any operating system, especially a GUI operating system, may be used in accordance with the present invention. Further, although the above embodiments are sample methods for simulating mouse gestures using a stylus, there are many variations that are encompassed by the present invention. For instance, the stylus gestures required for simulation a left click and a right click might be reversed, or a user may not need to always keep the stylus 204 down on the display surface 202 during the entire time that a drag is executed, such that a first touch/touch-and-hold of the stylus 204 at a first location on the display surface 202, and a second touch/touch-and-hold at a second location, may thereby simulate a drag from the first location to the second location.

As discussed in the co-pending patent applications incorporated by reference herein, the computer 201 according to embodiments of the present invention may have the ability to select ink when in pen mode. A user can press and hold, then drag over ink, text, or other objects, within a document to select those objects. A press and hold operation may switch into selection mode. Because the user is using the stylus 204 or other similar user pointing device, there are different considerations as compared with when a mouse is used. For instance, while the user of a mouse may hear and feel the click of a mouse button to ensure that a click has been performed, the user of the stylus 204 may not receive clear enough feedback that the intended gesture has been made properly. Also, it is desirable to indicate to the user that a particular requested mode has really been switched to, such as selection mode. Further, where the user must hold down the stylus 204 for at least a certain threshold amount of time to simulate, for example, a right click, feedback to the user indicating that the threshold time has passed would be useful.

Such feedback may be in the form of a state change indicator, which may be visual (e.g., a graphical icon, a symbol, a bitmapped or other image, etc., displayed on the display surface 202 such as state change indicator 205 in FIG. 2), auditory (e.g., a click, a beep, tone, etc. emanating from the computer 201 and/or stylus 204), and/or tactile (e.g., vibration of the computer 201 and/or stylus 204). For example, where the user selects the pen icon in the application toolbar (as described in at least one of the co-pending patent applications incorporated herein by reference), the user may drag the stylus 204 over a document displayed on the display surface 202 such that digital ink is generated on the display surface 202. At this point, the user may switch to selection mode by pressing and holding the stylus 204 for at least a threshold amount of time that may be the same as the threshold amount of time or that may be different. For instance, the threshold minimum amount of time that the user must hold the stylus 204 against the display surface 202 may be, in one embodiment, about 400 milliseconds, or between about 400 milliseconds and about 1 second, or more than about 1 second. Responsive to the user holding without substantial movement the stylus 204 against the display surface 202 for the minimum threshold amount of time, the computer 201 may generate a state change indicator on the display surface 202 which may be located at a location depending upon the location of the tip of the stylus 204. For example, the state change indicator may be located at or near the location of the tip of the stylus 204.

In some embodiments, the state change indicator may be animated and/or may otherwise change over time. For instance, the state change indicator 205 is shown as a partially completed clock-like loop that may become more complete over time in, e.g., a clockwise direction. In such embodiments with animation, the state change indicator may actually begin prior to the threshold amount of time passing, as an indication to the user that the threshold amount of time will soon pass. For instance, where a first threshold amount of time is 1 second, holding the stylus 204 against the display surface 202 for 500 milliseconds may cause an icon (a state change indicator) in the shape of a wand tip to appear on the display surface 202 at or near the location of the stylus 204. As the stylus 204 is continued to be held, the icon may animate and begin to glow to indicate that a gesture is beginning to form. At the first threshold amount of time, the animation may have reached the point where the wand tip is fully glowing. Moreover, at the passing of the first threshold of time, the user may thereby be placed in selection mode, which is indicated by the look of the state change indicator.

As a further possibility in connection with the above example, at a second threshold amount of time of, e.g., 2 seconds, the wand tip may further animate and/or change to indicate that a right click will now be simulated when the stylus 204 is removed from the display surface 202.

Where the user removes the stylus 204 from the display surface 202 prior to the threshold of time passing, then any subsequent stylus movement may be interpreted by the computer 201 as normal stylus input. Also, in this situation any state change indicator and/or animation thereof may be immediately canceled and removed from the display surface 202.

Figure 4:
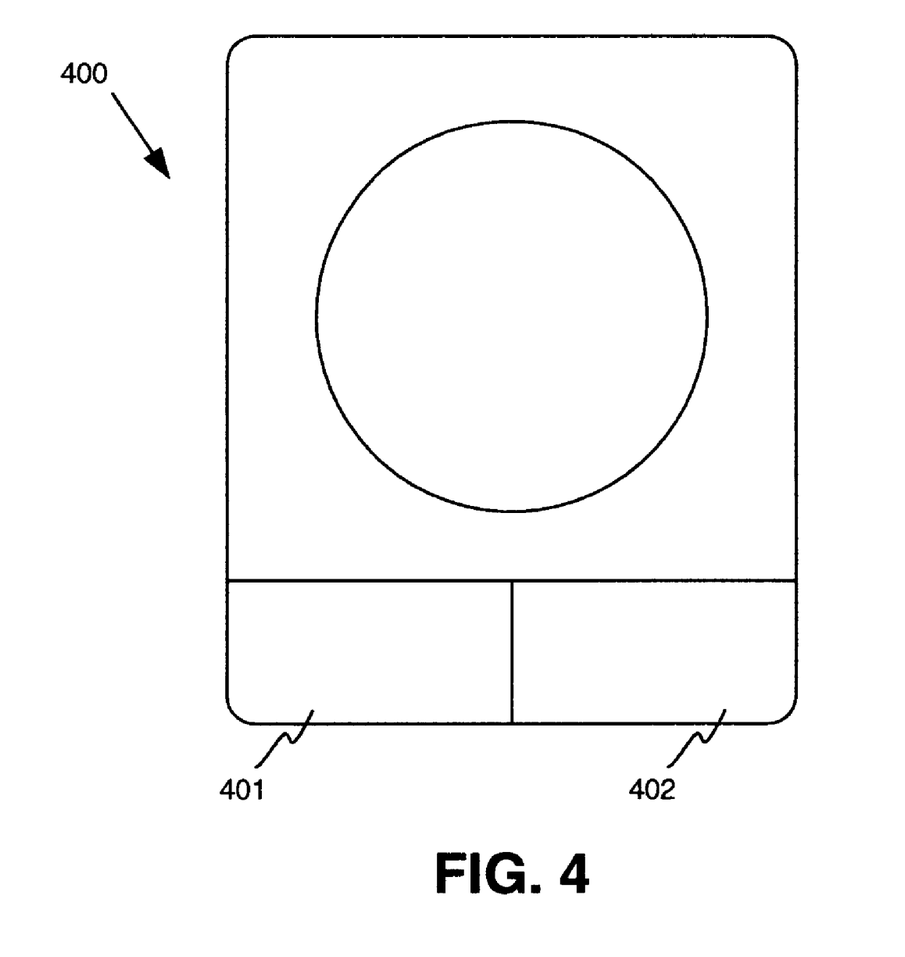
FIG. 4 is a plan view of an illustrative embodiment of a trackball having left and right buttons.

While exemplary systems and methods embodying the present invention are shown by way of example, it will be understood, of course, that the invention is not limited to these embodiments. Modifications may be made by those skilled in the art, particularly in light of the foregoing teachings. For example, each of the elements of the aforementioned embodiments may be utilized alone or in combination with elements of the other embodiments. Also, although the above exemplary embodiments were described with regard to simulating a mouse, the simulation of other pointing devices (e.g., a trackball 400, such as shown in FIG. 4, having a left button 401 and a right button 402) falls within the scope and spirit of the invention described herein.

We claim:

1. In a computer, a method for simulating at least one gesture of a pointing device having at least a primary switch and a secondary switch, the method comprising the steps of:
   first detecting whether a stylus is being held down on a touch-sensitive display surface for at least a threshold amount of time;
   second detecting whether the stylus is then removed from the touch-sensitive display surface after at least the threshold amount of time; and
   responsive to the stylus being removed as detected in the step of second detecting, generating at least one event representing the secondary switch of the pointing device being activated.

2. The method of claim 1, wherein the step of generating further includes generating at least one event representing the secondary switch being deactivated after the event representing the secondary switch of the pointing device being activated.

3. The method of claim 1, further including generating a state change indicator responsive to the step of first detecting.

4. The method of claim 1, further including the steps of:
   third detecting whether the stylus is moved along the touch-sensitive display surface prior to being removed from the touch-sensitive display surface but after the threshold amount of time has passed; and
   responsive to the stylus being moved as detected in the step of third detecting, generating at least one event representing the secondary switch of the pointing device being activated.

5. The method of claim 4, further including the steps of:
   fourth detecting whether the stylus is moved along the touch-sensitive display surface after the step of third detecting; and
   responsive to the stylus being moved as detected in the step of fourth detecting, generating at least one event representing movement of the pointing device.

6. The method of claim 5, further including the steps of:
   fifth detecting whether the stylus is removed from the touch-sensitive display surface after the step of fourth detecting; and
   responsive to the stylus being removed as detected in the step of fifth detecting, generating at least one event representing the secondary switch of the pointing device being deactivated.

7. The method of claim 1, further including generating at least one event representing the primary switch of the pointing device being activated responsive to the stylus being removed from the touch-sensitive display surface before the threshold amount of time as detected in the step of first detecting.

8. The method of claim 7, further including generating at least one event representing the primary switch of the pointing device being deactivated after the event representing the primary switch of the pointing device being activated.

9. The method of claim 1, further including the steps of:
   sixth detecting whether the stylus moves along the touch-sensitive display surface prior to the threshold amount of time having passed; and
   generating at least one event representing the primary switch of the pointing pointing device being activated responsive to the stylus being moved along the touch-sensitive display surface as detected in the step of sixth detecting.

10. The method of claim 9, further including the steps of:
    seventh detecting whether the stylus is moved along the touch-sensitive display surface after the step of sixth detecting; and
    responsive to the stylus being moved as detected in the step of seventh detecting, generating at least one event representing movement of the pointing device.

11. The method of claim 10, further including the steps of:
    eighth detecting whether the stylus is removed from the touch-sensitive display surface after the step of seventh detecting; and
    responsive to the stylus being removed as detected in the step of eighth detecting, generating at least one event representing the primary switch of the pointing device being activated.

12. The method of claim 1, wherein the pointing device comprises a mouse, the primary switch comprises a left button of the mouse, and the secondary switch comprises a right button of the mouse.

13. The method of claim 1, wherein the pointing device comprises a trackball, the primary switch comprises a left button of the trackball, and the secondary switch comprises a right button of the trackball.

14. A computer configured to simulate at least one gesture of a pointing device having a primary switch and a secondary switch responsive to stylus input, the computer comprising:
    a touch-sensitive display surface; and
    a processor coupled to the touch-sensitive display surface and configured to detect whether the stylus is held against the touch-sensitive display surface for at least a threshold amount of time, and in response to the stylus being held against the touch-sensitive display surface for at least the threshold amount of time generating at least one event representing an activation of the secondary switch of the pointing device, and in response to the stylus being removed from the touch-sensitive display surface before the threshold amount of time generating at least one event representing an activation of the primary switch of the pointing device.

15. The computer of claim 14, wherein the processor is further configured to generate at least one event representing the secondary switch of the pointing device being deactivated after the event representing the secondary switch of the pointing device being activated.

16. The method of claim 14, wherein the pointing device comprises a mouse, the primary switch comprises a left button of the mouse, and the secondary switch comprises a right button of the mouse.

17. The method of claim 14, wherein the pointing device comprises a trackball, the primary switch comprises a left button of the trackball, and the secondary switch comprises a right button of the trackball.

18. A computer-readable medium having computer-executable instructions for performing steps for simulating at least one gesture of a pointing device having a primary switch and a secondary switch, the steps comprising:

first detecting whether a stylus is being held on a touch-sensitive display surface for at least a threshold amount of time;

second detecting whether the stylus is then removed from the touch-sensitive display surface after at least the threshold amount of time; and responsive to the stylus being removed as detected in the step of second detecting, generating event representing the secondary switch of the pointing device being activated.

19. The computer-readable medium of claim 18, further having computer-executable instructions for performing the step of generating at least one event representing the secondary switch of the pointing device being deactivated after the event representing the secondary switch of the pointing device being activated.

20. The method of claim 18, wherein the pointing device comprises a mouse, the primary switch comprises a left button of the mouse, and the secondary switch comprises a right button of the mouse.

21. The method of claim 18, wherein the pointing device comprises a trackball, the primary switch comprises a left button of the trackball, and the secondary switch comprises a right button of the trackball.

22. In a computer, a method for simulating at least one gesture of a pointing device having a primary switch and a secondary switch, the method comprising the steps of:

first detecting whether a stylus is being held down on a touch-sensitive display surface for at least a first threshold amount of time;

second detecting whether the stylus is then removed from the touch-sensitive display surface before or after the first threshold amount of time;

responsive to the stylus being removed at a time before the first threshold amount of time has passed, generating at least one event representing one of the primary switch of the pointing device being activated or the secondary switch of the pointing device being activated; and responsive to the stylus being removed at a time after the first threshold amount of time has passed, generating at least one event representing the other of the primary switch of the pointing device being activated and the secondary switch of the pointing device being activated.

23. The method of claim 22, further including the steps of:

third detecting whether the stylus is moved along the touch-sensitive display surface prior to the threshold amount of time having passed; and responsive to the stylus being moved as detected in the step of third detecting, generating at least one event representing a primary switch drag of the pointing device.

24. The method of claim 23, further including the steps of:

fourth detecting whether the stylus is moved along the touch-sensitive display surface after to the first threshold amount of time having passed but not before; and responsive to the stylus being moved as detected in the step of fourth detecting, generating at least one event representing a secondary switch drag of the pointing device.

25. The method of claim 22, wherein the first threshold amount of time is about 600 milliseconds.

26. The method of claim 22, wherein the first threshold amount of time is between 300 and 600 milliseconds.

27. The method of claim 22, wherein the first threshold amount of time is between 600 milliseconds and 1 second.

28. The method of claim 22, further including the steps of:

fifth detecting whether the stylus remains held down on the touch-sensitive display surface for at least a second threshold amount of time later in time than the first threshold amount of time; and responsive to the stylus remaining held down as detected in the step of fifth detecting, generating at least one event representing the secondary switch of the pointing device being activated.

29. The method of claim 28, wherein the second threshold of time is about 700 milliseconds.

30. The method of claim 22, further including generating a state change indicator responsive to the stylus being held down for at least a third threshold amount of time.

31. The method of claim 30, wherein the third threshold amount of time is equal to the first threshold amount of time.

32. The method of claim 30, wherein the step of generating the state change indicator includes generating a visual state change indicator on the touch-sensitive display surface that changes over time.

33. The method of claim 32, wherein the third threshold amount of time is less than the first threshold amount of time.

34. The method of claim 30, wherein the step of generating the state change indicator includes generating a visual state change indicator on the touch-sensitive display surface at a location depending upon a location of the stylus.

35. The method of claim 22, wherein the pointing device comprises a mouse, the primary switch comprises a left button of the mouse, and the secondary switch comprises a right button of the mouse.

36. The method of claim 22, wherein the pointing device comprises a trackball, the primary switch comprises a left button of the trackball, and the secondary switch comprises a right button of the trackball.

37. In a computer, a method for providing feedback responsive to use of a stylus on a touch-sensitive display surface, the method comprising the steps of:

detecting whether a stylus is being held down on a touch-sensitive display surface for at least a threshold amount of time; and generating a state change indicator responsive to the stylus being held down for at least the threshold amount of time.

38. The method of claim 37, wherein the step of generating includes generating a visual state change indicator on the touch-sensitive display surface.

39. The method of claim 37, wherein the step of generating includes generating a visual state change indicator at a location on the touch-sensitive display surface depending upon a location of the stylus.

40. The method of claim 37, wherein the step of generating includes generating an animated visual state change indicator on the touch-sensitive display surface.

41. The method of claim 37, wherein the pointing device comprises a mouse, the primary switch comprises a left button of the mouse, and the secondary switch comprises a right button of the mouse.

42. The method of claim 37, wherein the pointing device comprises a trackball, the primary switch comprises a left button of the trackball, and the secondary switch comprises a right button of the trackball.

43. An apparatus comprising:

a touch-sensitive display surface; and a processor coupled to the touch-sensitive display surface and configured to:

responsive to detecting that a stylus is brought down on the touch-sensitive display surface, count at least a threshold amount of time and determine whether the stylus is held down on the touch-sensitive display surface for at least the threshold amount of time, and responsive to detecting that the stylus is later removed from the touch-sensitive display surface, generate at least one event representing one or the other of a left click of a pointing device and a right click of a pointing device depending upon whether the stylus is removed before or after the threshold amount of time has passed.

44. The apparatus of claim 43, wherein the processor is running a program, the program being configured to be responsive to the event generated by the processor.

45. The apparatus of claim 43, wherein the event comprises one of a LeftMouseButtonDown event and a RightMouseButtonDown event.

46. The method of claim 43, wherein the pointing device comprises a mouse having a primary switch corresponding to the left click and a secondary switch corresponding to the right click, the primary switch comprising a left button of the mouse, and the secondary switch comprising a right button of the mouse.

47. The method of claim 43, wherein the pointing device comprises a trackball, having a primary switch corresponding to the left click and a secondary switch corresponding to the right click, the primary switch comprising a left button of the trackball, and the secondary switch comprising a right button of the trackball.

* * * * *

(12) INTER PARTES REEXAMINATION CERTIFICATE (1205th)
United States Patent
Keely et al.

(10) Number: US 6,791,536 C1
(45) Certificate Issued: Nov. 10, 2015

(54) SIMULATING GESTURES OF A POINTING DEVICE USING A STYLUS AND PROVIDING FEEDBACK THERETO (75) Inventors: Leroy B. Keely, Portola Valley, CA (US); David F. Jones, Redmond, WA (US); David Switzer, Redmond, WA (US); Michael Hin-cheung Tsang, Bellevue, WA (US); William Hong Vong, Seattle, WA (US)

(73) Assignee: Microsoft Technology Licensing, LLC

Reexamination Request:
No. 95/002,315, Sep. 14, 2012

Reexamination Certificate for:
Patent No.: 6,791,536
Issued: Sep. 14, 2004
Appl. No.: 09/815,272
Filed: Mar. 23, 2001

Related U.S. Application Data

(60) Provisional application No. 60/247,844, filed on Nov. 10, 2000.

(51) Int. Cl.
*G09G 5/00* (2006.01)
*G06F 3/0488* (2013.01)

(52) U.S. Cl.
CPC ................... *G06F 3/04883* (2013.01)

(58) Field of Classification Search
None
See application file for complete search history.

(56) References Cited

To view the complete listing of prior art documents cited during the proceeding for Reexamination Control Number 95/002,315, please refer to the USPTO's public Patent Application Information Retrieval (PAIR) system under the Display References tab.

*Primary Examiner* — Christina Y Leung (57) ABSTRACT

A method and apparatus for simulating at least one gesture of a pointing device such as a mouse. A left click, right click, left drag, right drag, and/or mouse movement may be simulated using a stylus in conjunction with a touch-sensitive display surface. For example, a computer having the display surface may detect whether a stylus is being held down on a touch-sensitive display surface for at least a threshold amount of time. The computer may further detect whether the stylus is then removed from the touch-sensitive display surface after at least the threshold amount of time. Responsive to the stylus being removed, the computer may generate at least one event representing a right mouse button being pressed.

INTER PARTES REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-3, 7, 12-22, 28 and 30-47 are cancelled.

Claims 4-6, 8-11, 23-27 and 29 were not reexamined.

\* \* \* \* \*